United States Patent [19]
Lai

[11] Patent Number: 5,653,594
[45] Date of Patent: Aug. 5, 1997

[54] EDUCATIONAL TOY FOR LEARNING MULTIPLICATION

[76] Inventor: Chuen-Chung Lai, 1F, No. 12, Lane 76, Chuyan N. Rd., Sanchung City, Taipei Hsien, Taiwan

[21] Appl. No.: 613,910

[22] Filed: Mar. 11, 1996

[51] Int. Cl.$^6$ .................................................. G09B 1/16
[52] U.S. Cl. ........................ 434/209; 434/172; 434/207
[58] Field of Search .................................. 434/208, 209, 434/207, 193, 195, 172, 171, 170

[56] References Cited

U.S. PATENT DOCUMENTS

| | | | |
|---|---|---|---|
| 2,513,596 | 7/1950 | Severson et al. | 434/208 |
| 4,212,117 | 7/1980 | Baldwin et al. | 434/208 |
| 4,419,081 | 12/1983 | Steinmann | 434/208 |
| 4,422,642 | 12/1983 | Fletcher | 434/207 |
| 5,120,226 | 6/1992 | Tsai | 434/208 |
| 5,238,407 | 8/1993 | Pollock | 434/208 |
| 5,338,203 | 8/1994 | Rheams | 434/208 |

FOREIGN PATENT DOCUMENTS 2255915  11/1992  United Kingdom ................... 434/208

*Primary Examiner*—Paul J. Hirsch

[57] ABSTRACT

An educational toy which includes a base board having lines of female mounting portions longitudinally disposed at the first, third, fifth, and six lines and a line of signs of multiplication longitudinally disposed at the second line and a line of sings of equality at the fourth line, a set of setting blocks, each setting block having a male mounting portion at the bottom for fitting into engagement with one female mounting portion of the base board, and a set of number blocks, each number block having a female mounting portion at the bottom for fitting into engagement with one particular setting block, the number blocks including a blank number block having a blank top, and a set of numerical blocks respectively marked with one of the numerical signs from 0 to 9 at the top.

3 Claims, 5 Drawing Sheets

EDUCATIONAL TOY FOR LEARNING MULTIPLICATION

BACKGROUND OF THE INVENTION

The present invention relates to educational toys, and relates more particularly to such an educational toy for learning multiplication which teaches children to lean multiplication by means of playing a block game.

A variety of block toys and picture puzzles have been disclosed for children to play with in training their imagination and power of reaction. There are also educational block toys for learning mathematics for example the addition and the subtraction. However, these educational block toys give little help to children in training the power of thinking and the ability of identifying different figures.

SUMMARY OF THE INVENTION

The present invention has been accomplished under the circumstances in view. It is one object of the present invention to provide an educational toy which teaches children to learn multiplication by means of playing a block game. It is another object of the present invention to provide an educational toy which teaches children to train their thinking power and the ability of reaction. According to the present invention, the educational toy comprises a base board having lines of female mounting portions longitudinally disposed at the first, third, fifth, and sixth lines and a line of signs of multiplication longitudinally disposed at the second line and a line of sings of equality at the fourth line, a set of setting blocks, each setting block having a male mounting portion at the bottom for fitting into engagement with one female mounting portion of the base board, and a set of number blocks, each number block having a female mounting portion at the bottom for fitting into engagement with one particular setting block, the number blocks including a blank number block having a blank top, and a set of numerical blocks respectively marked with one of the numerical signs from 0 to 9 at the top. When a setting block is installed in the base board and the correct number block is fastened to the installed setting block, the centers of the two blocks are coincide with each other.

DETAILED DESCRIPTION OF THE PREFERRED EMBODIMENT

Figure 1:
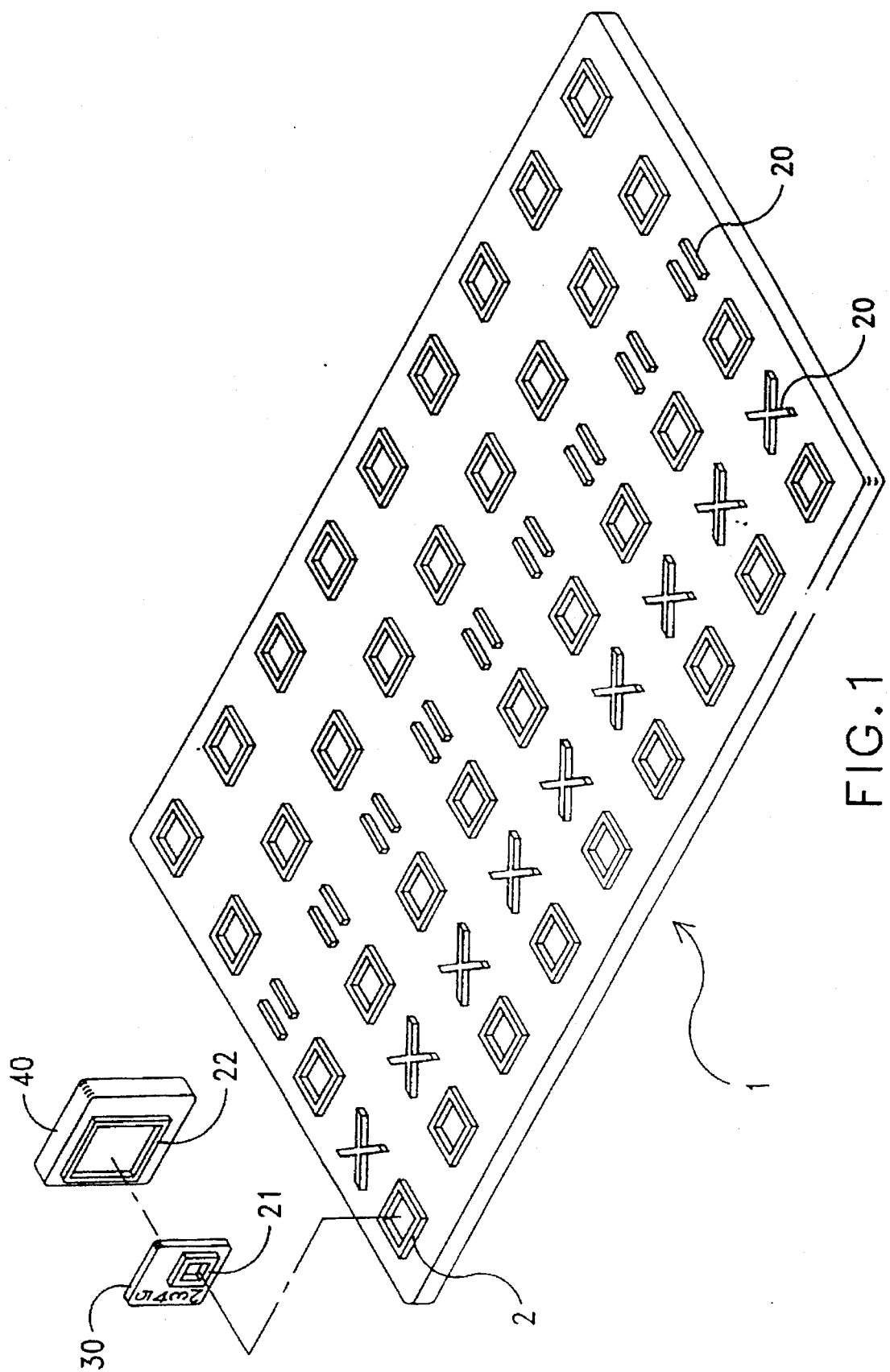
FIG. 1 is an exploded view of the present invention showing the structure of the base board, one setting block, and one number block thereof.
Figure 2:
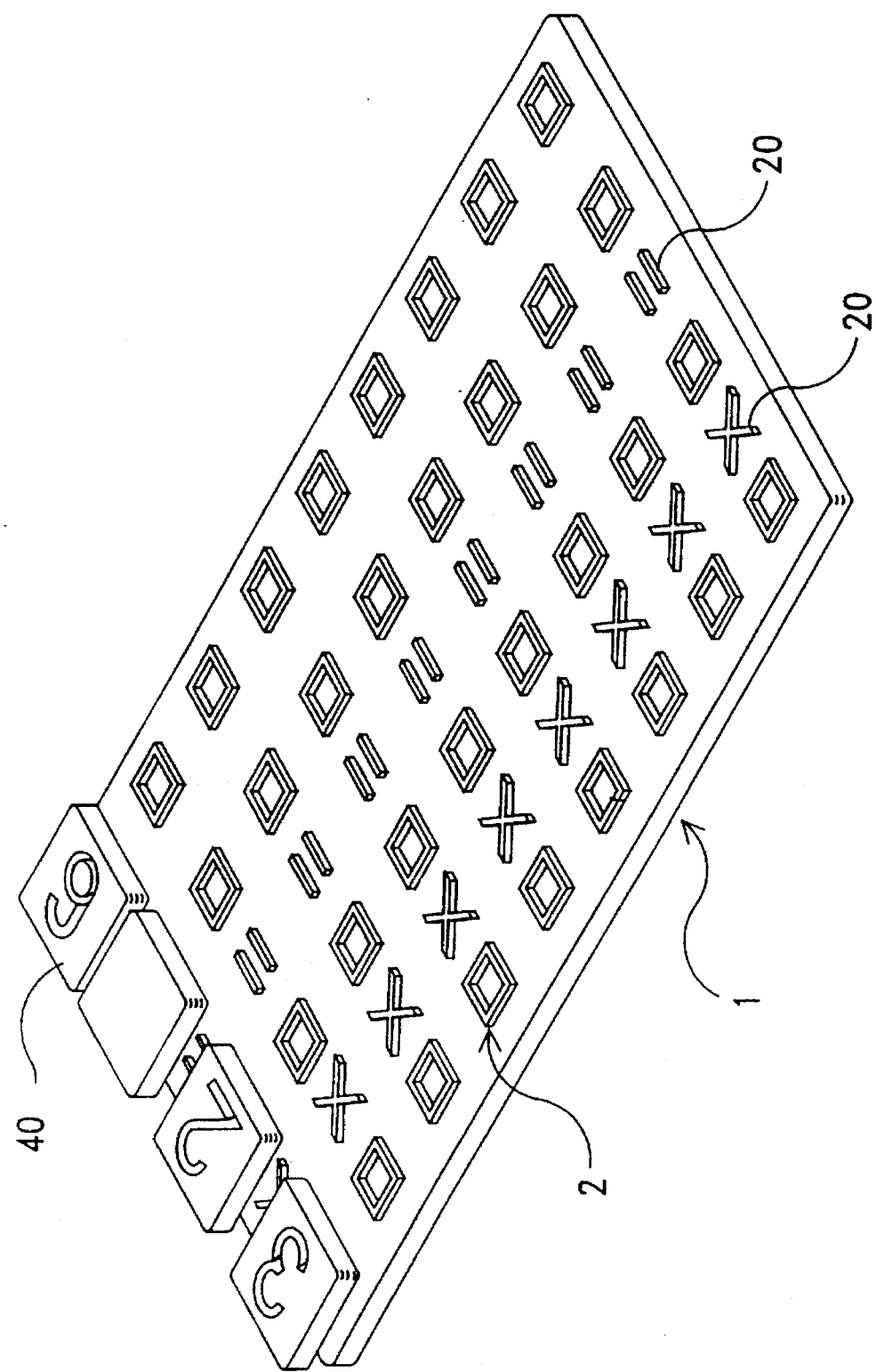
FIG. 2 is an applied view of the present invention, showing one equation set in the base board.
Figure 3:
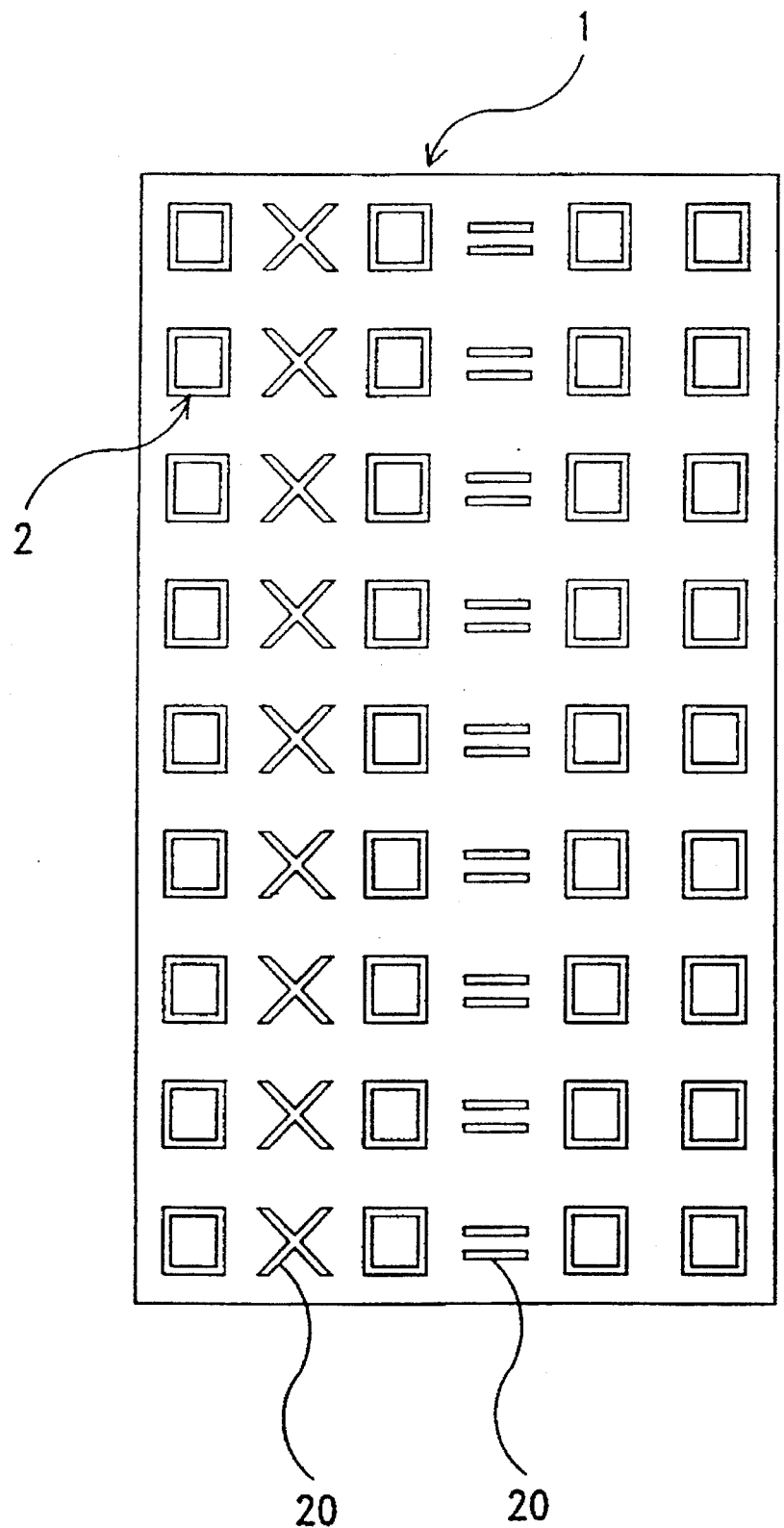
FIG. 3 is a top view of the base board according to the present invention.

Referring to FIGS. 1, 2, and 3, an educational toy in accordance with the present invention is generally comprised of a base board 1, a set of setting blocks 30, and a set of number blocks 40. The base board 1 comprises two longitudinal lines of signs 20 raised from the top side, namely the signs of multiplication and the signs of equality, and four longitudinal lines of female mounting portions 2 raised from the top side, wherein the female mounting portions 2 are respectively arranged at the first, third, fifth, and sixth lines; the signs of multiplication are arranged at the second line; the signs of equality are arranged at the fourth line. Each of the setting blocks 30 has a male mounting portion 21 at the bottom side which can be forced into engagement with one female mounting portion 2. Each of the number blocks 40 has a female mounting portion 22 which can be forced into engagement with one setting block 30. The number blocks 40 are designed to match with the setting blocks 30 respectively. When one setting block 30 is fastened to one female mounting portion 2 of the base board 1, the correct number block 40 must be selected and fastened to the installed setting block 30. When the correct number block 40 is installed, its center coincides with the center of the corresponding female mounting portion 2. If a wrong number block 40 is installed, it will be retained at an offset position.

Figure 4:
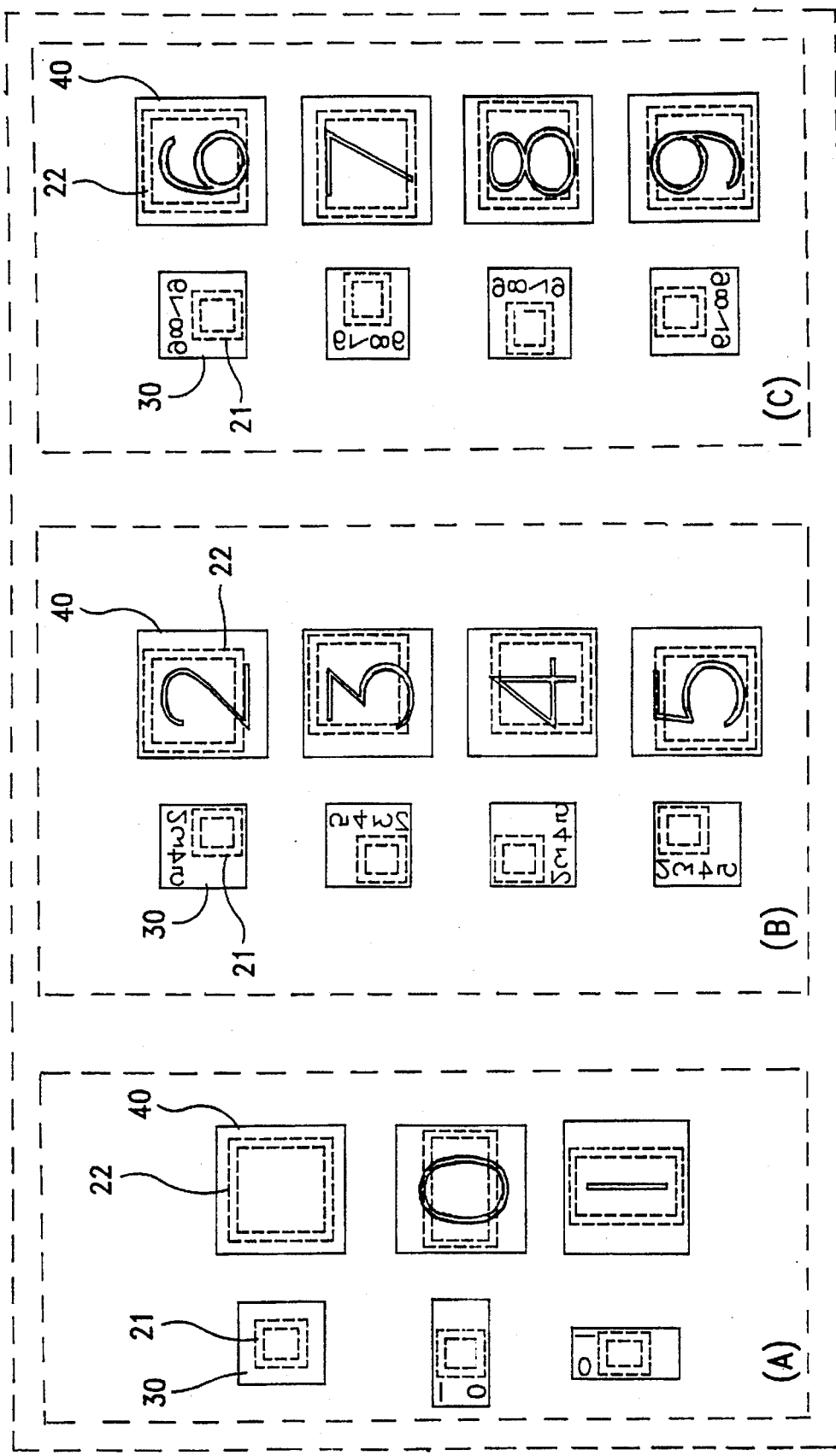
FIG. 4(a–e) is a perspective view of one set of setting blocks and one set of number blocks according to the present invention.

Referring to FIG. 4, the setting blocks 30 and the number blocks 40 respectively include three groups, namely, the first group (A), the second ground (B), and the third group (C). The three groups may be differently colored. The first group (A) includes the blank block, the numerical blocks "0" and "1", wherein the mounting portion 21 or 22 of the blank block is made of square shape and disposed at the center, the mounting portion 21 or 22 of the zero block is made of rectangular shape and disposed in the transverse direction; the mounting portion 21 or 22 of the "one" block is made of rectangular shape and disposed in the longitudinal direction. The second group (B) includes the numerical blocks from 2 to 5, wherein the mounting portions 21 of the respective setting blocks 30 are respectively arranged in the lower right corner (the number "2"), the lower left corner (the number "3"), the upper left corner (the number "4"), and the upper right corner (the number "5"); the mounting portions 22 of the respective number blocks 40 are respectively arranged in the upper left corner (the number "2"), the upper right corner (the number "3"), the lower right corner (the number "4"), and the lower left corner (the number "5"). The third group (C) includes the numerical blocks from 6 to 9, wherein the mounting portions 21 of the respective setting blocks 30 are respectively arranged in the six o'clock position (the number "6"), the three o'clock position (the number "7"), the nine o'clock position (the number "8"), and the twelve o'clock position (the number "9"); the mounting portions 22 of the respective number blocks 40 are respectively arranged in the twelve o'clock position (the number "6"), the nine o'clock position (the number "7"), the three o'clock position (the number "8"), and the six o'clock position (the number "9"). The setting blocks 30 of the numerical blocks of the first group (A) are respectively marked with the mark of "1 ○" at the bottom side; the setting blocks 30 of the numerical blocks of the second group (B) are respectively marked with the mark of "2 ⌣ ⌵ ⌒"; the setting blocks of the numerical blocks of the third group (C) are respectively marked with the mark of "6 ↷ ∞ 6"; the number blocks 40 of the numerical blocks of the first group (A) are respectively marked with the mark of "0" or "1" at the top side; the number blocks 40 of the numerical blocks of the second group (B) are respectively marked with the mark of "2", "3", "4", or 5" at the top; the number blocks of the numerical blocks of the third group (C) are respectively marked with the mark of "6", "7", "8", or "9" at the top side.

Referring to FIGS. 1, 2, and 4 again, when to set the equation of 3×2=6, the setting block for the first position must be the second block of the second group (B), the setting block for the second position must be the first block of the second group (B), the setting block for the third position (the first position of the answer area) must be the first block of first group (A), the setting block for the fourth position (the answer area) must be the first block of the third group (C). If to answer the question set by the installed setting blocks 30, the respective correct number blocks 40 must be taken and fastened to the installed setting blocks 30. When the correct answer is obtained, the installed number blocks 40 are transversely aligned. If the installed number blocks 40 are not aligned, it means that a wrong answer is given. Alternatively, the teacher can set the respective setting blocks 30 and number blocks 40 to base board 1 to present a question for example "3×2=☐ ☐", and then ask the child to give the answer, and the child must take the number block of the first block of the first group (A) and fasten it to the setting block in the third position (the first position of the answer area), then take the number block of the first block of the third group (C) and fasten it to the setting block in the fourth position (the second position of the answer area). The teacher can also set the question as "3×☐=6; ☐×2=6; etc.

Figure 5:
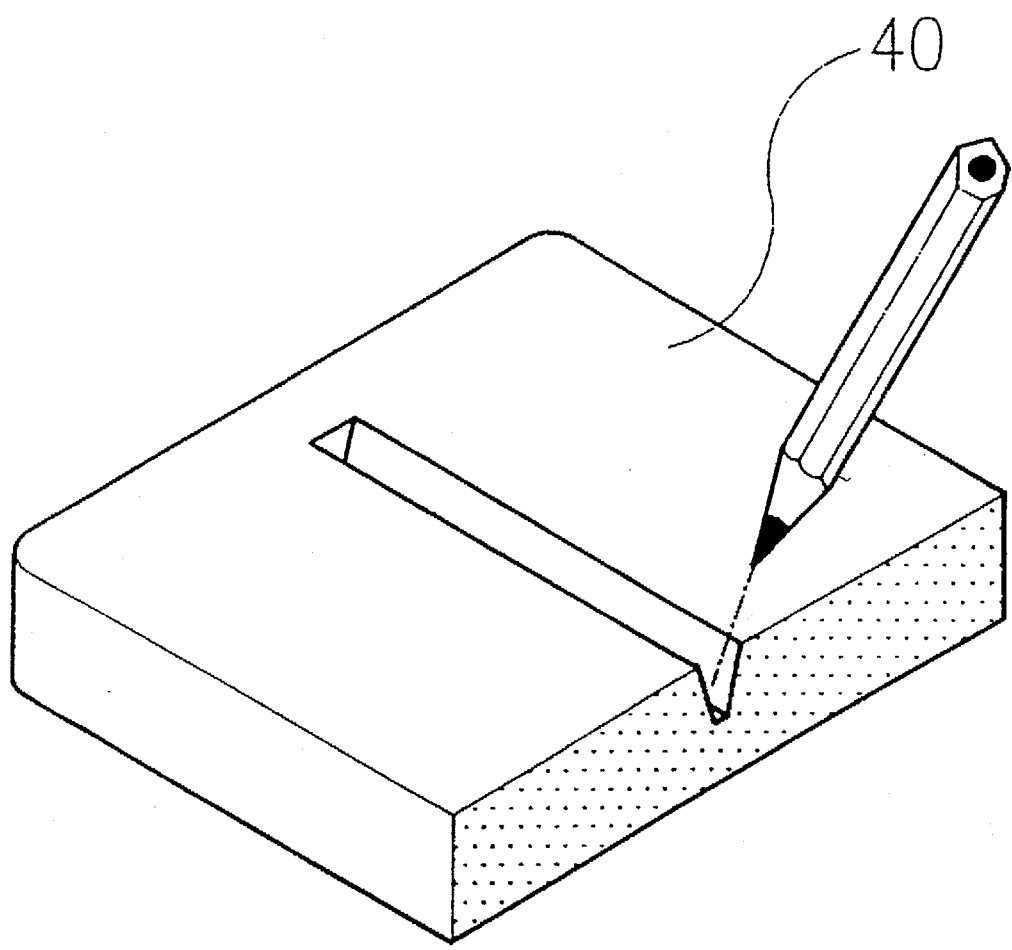
FIG. 5 is an elevational view of one number block in an enlarged scale according to the present invention.

Referring to FIG. 5 and FIG. 4 again, the numerical sign at the top side of each number block 40 is grooved, as shown in FIG. 5, and the grooved numerical sign of each number block 40 has a \_/-like cross section. Furthermore, the angles of the setting blocks 30 and the number blocks 40 are respectively and smoothly chamfered to prevent injury to the hand.

Furthermore, one full set of the educational toy includes:

(a) base board: 8 pieces (b) blank setting block: 14 pieces (c) blank number block: 14 pieces (d) setting block for 0 and 1: 36 pieces (e) setting block for 2 to 5: 136 pieces (f) setting block for 6 to 9: 102 pieces (g) number block for 0: 8 pieces (h) number block for 1: 28 pieces (i) number block for 3, 5, 8: 29 pieces each (j) number block for 2: 41 pieces (k) number block for 4: 37 pieces (l) number block for 6: 31 pieces (m) number block for 7: 22 pieces (n) number block for 9: 20 pieces Because one base board 1 has 36 female mounting portions 36 raised from the top side, there are total 288 female mounting portions 36 for setting all combinations of the 9×9 multiplication table when 8 pieces of base boards 1 are provided.

What the invention claimed is:

1. An educational toy comprising a base board, a set of setting blocks, and a set of number blocks designed to match with said set of setting blocks respectively, said base board comprising a first longitudinal line of female mounting portions, a second longitudinal line of signs of multiplication, a third longitudinal line of female mounting portions, a fourth longitudinal line of signs of equality, a fifth longitudinal line of female mounting portions, and a six longitudinal line of female mounting portions respectively raised from the top surface of said base board and aligned; each of said setting blocks has a male mounting portion at its bottom surface for fitting into engagement with one female mounting portion of said base board; said set of number blocks includes at least one blank number block and a set of numerical blocks, said numerical blocks being respectively marked with one of the numerical signs from 0 to 9 at the top surface, each number block having a female mounting portion at bottom for fitting into engagement with a corresponding setting block, the female mounting portions of said number blocks being respectively disposed at different locations on their respective bottom surfaces so that the centers of said number blocks coincide with the centers of respective ones of said base female mounting portions when the correct number block is fastened to the corresponding setting block.

2. The educational toy of claim 1 wherein the numerical sign of each numerical block of said set of number blocks is grooved, and the grooved numerical sign of each numerical block has a \_/-like cross section.

3. The educational toy of claim 1 wherein said number blocks are divided into a plurality of groups respectively colored with a particular color.

* * * * *